United States Patent
Oh et al.

(10) Patent No.: US 9,381,711 B2
(45) Date of Patent: Jul. 5, 2016

(54) SCREW PRESS DEWATERING DEVICE USING SHEARING BLADE

(71) Applicant: Jeong Hwan Oh, Daejeon (KR)

(72) Inventors: Jeong Hwan Oh, Daejeon (KR); Jai Won Yu, Kwangju (KR); Si Young Choi, Kwangju (KR)

(*) Notice: Subject to any disclaimer, the term of this patent is extended or adjusted under 35 U.S.C. 154(b) by 143 days.

(21) Appl. No.: 14/322,860

(22) Filed: Jul. 2, 2014

(65) Prior Publication Data

US 2015/0040779 A1    Feb. 12, 2015

(30) Foreign Application Priority Data

Jul. 18, 2013    (KR) .................... 10-2013-0084777

(51) Int. Cl.
| | |
|---|---|
| *B30B 9/12* | (2006.01) |
| *B01D 33/46* | (2006.01) |
| *B30B 9/26* | (2006.01) |
| *B01D 33/00* | (2006.01) |
| *B30B 9/14* | (2006.01) |

(52) U.S. Cl.
CPC .............. *B30B 9/121* (2013.01); *B01D 33/0067* (2013.01); *B01D 33/466* (2013.01); *B30B 9/14* (2013.01); *B30B 9/26* (2013.01)

(58) Field of Classification Search
CPC ............ B30B 9/12; B30B 9/121; B30B 9/14; B30B 9/26; B01D 29/23; B01D 29/6476; B01D 33/0067; B01D 33/466; C02F 11/125; F26B 11/0481; F26B 2200/18
USPC ........ 100/98 R, 112, 117, 145, 146; 210/391, 210/396, 408, 781, 784, 791, 797; 415/121.1, 169.1, 72
See application file for complete search history.

(56) References Cited

U.S. PATENT DOCUMENTS

| | | | | |
|---|---|---|---|---|
| 3,695,173 | A * | 10/1972 | Cox ........................... | B30B 9/12 100/112 |
| 4,117,984 | A * | 10/1978 | Waxelbaum ............ | B02C 13/13 241/191 |
| 4,774,097 | A * | 9/1988 | Bushman .................. | B04B 3/00 100/117 |
| 5,857,406 | A * | 1/1999 | Scheucher ................. | B30B 9/12 100/112 |
| 6,241,902 | B1 * | 6/2001 | Huebner ................. | B01D 29/23 100/112 |
| 6,615,710 | B1 * | 9/2003 | Ishigaki ............... | B01D 29/118 100/111 |

FOREIGN PATENT DOCUMENTS

| | | |
|---|---|---|
| JP | 2003181496 A | 7/2003 |
| KR | 1020060028359 A | 3/2006 |
| KR | 20080113696 A | 12/2008 |

* cited by examiner

*Primary Examiner* — Jimmy T Nguyen

(57) ABSTRACT

The present invention relates to a screw press dehydrator so as to facilitate transport of sludge and efficiently destroy microorganisms constituting sludge.

4 Claims, 6 Drawing Sheets

SCREW PRESS DEWATERING DEVICE USING SHEARING BLADE

This application claims foreign priority benefits under 35 U.S.C. Section 119 and 172 of Korea Patent Application Serial No 10-2013-0084777, filed on Jul. 18, 2013, which is incorporated by reference in its entirety into this application.

BACKGROUND

1. Field of the Invention

The present invention relates to a screw press dehydrator using a cutting blade. More specifically, the present invention relates to a screw press dehydrator using a cutting blade wherein a plurality of cutting panels vertically connected to a screw are spaced from a central shaft so as to facilitate transport of sludge and enable the cutting panels to efficiently destroy microorganisms constituting sludge, a cutting blade is connected to an end of each of the cutting panels at an acute or obtuse angle based on the cutting panel, to maximize destruction of cell membranes and dehydration, and the cutting panels are provided with a plurality of holes to improve cutting force and prevent sludge from clogging a dehydration mesh when sludge is transported by operation of the screw resulting from rotation of a central shaft.

2. Description of the Related Art

In general, a great amount of sludge is discharged from sewage treatment plants or wastewater treatment plants in the process of wastewater treatment. In order to facilitate secondary disposal such as transport and transfer of the discharged sludge, water should be removed from the sludge.

Conventional dehydrators for removing water from sludge include belt presses, filter presses, centrifugal dehydrators, multi-disc dehydrators and the like. These dehydrators generally separate sludge from water by compressing sludge.

The sludge dehydrated by the conventional method is dehydrated to a water content of about 75 to 85% and is then discharged as a sludge cake, although the water content may vary slightly according to phase and ingredients.

In accordance with the London Convention regulating sea dumping of wastes, sea dumping of food wastes has been prohibited since 2012, sea dumping of excreta wastes has been prohibited since 2013 and sea dumping of industrial wastes has been prohibited since 2014.

In accordance with the prohibition of sea dumping of sewage or livestock excreta, there is a need for methods of efficiently removing water constituting most of the weight of sludge produced during the waste treatment process to reduce cost and efforts required for treatment of these wastes.

Meanwhile, sewage and livestock excretions are treated with aerobic or anaerobic microbes. As a result, the sludge is mostly composed of the dead microbes. Accordingly, a great amount of sludge water is incorporated into cells of microbes constituting sludge.

Accordingly, destruction of cell membranes of cells constituting the sludge is inevitable so as to easily remove water from the sludge.

Sludge dehydration using a conventional simple compression method has a limitation on reducing water content of sludge because microbe cells in the sludge cannot be destroyed through application of force in only one direction.

Accordingly, there is a need for sludge dehydrators capable of removing water from microorganism cells by destroying cell membranes of microorganisms constituting sludge.

SUMMARY

Therefore, the present invention has been made in view of the above problems, and it is an object of the present invention to provide a dehydrator which greatly reduces water content of sludge by destroying cell membranes through application of a cutting force to the sludge in the process of disposing sewage or livestock excretions.

The sludge dehydrator according to the present invention can greatly reduce water content of sludge cake to 65 to 75% and decrease the weight of conventional sludge having a water content of 80±2% by 20% or more.

In addition, the cutting blade has an end inclined at a predetermined angle to improve cutting force upon rotation of the screw and the cutting blade continuously removes the sludge by continuously scraping a porous dehydration mesh formed in the sludge dehydrator so as to prevent the sludge from clogging the dehydration mesh. As a result, a conventional problem in which sludge clogging the dehydration mesh causes deterioration in dehydration function is solved and dehydration efficiency is thus improved.

In accordance with the present invention, the above and other objects can be accomplished by the provision of a screw press dehydrator for dehydrating sludge in sewage or livestock excretions, including a central shaft rotatably connected to a driving motor; a plurality of screws helically formed on the outer circumference of the central shaft, the screws transporting sludge and generating compression force upon rotation of the shaft to dehydrate sludge; a plurality of cutting panels fixed between the screws in a straight line, each cutting panel spaced from the central shaft to form a gap between the cutting panel and the shaft; and a cutting blade formed on an end of the cutting panel, the cutting blade bent at a predetermined angle.

The cutting blade formed on the end of the cutting panel removes sludge clogging a dehydration mesh by scraping the porous dehydration mesh formed in the sludge dehydrator.

In addition, the cutting blade is inclined at an acute angle or an obtuse angle of 40 to 140° when the end of the cutting panel is horizontal. A plurality of cutting panels having the gap between the cutting panel and the shaft are disposed in a row in the central shaft direction and are fixed to the screw.

A plurality of holes are formed in each cutting panel so as to improve the cutting force applied to the sludge when the sludge is transported by the screw upon rotation of the central shaft. In addition, the present invention provides a screw press dehydrator wherein the cutting blade is fixedly or removably mounted on the cutting panel.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
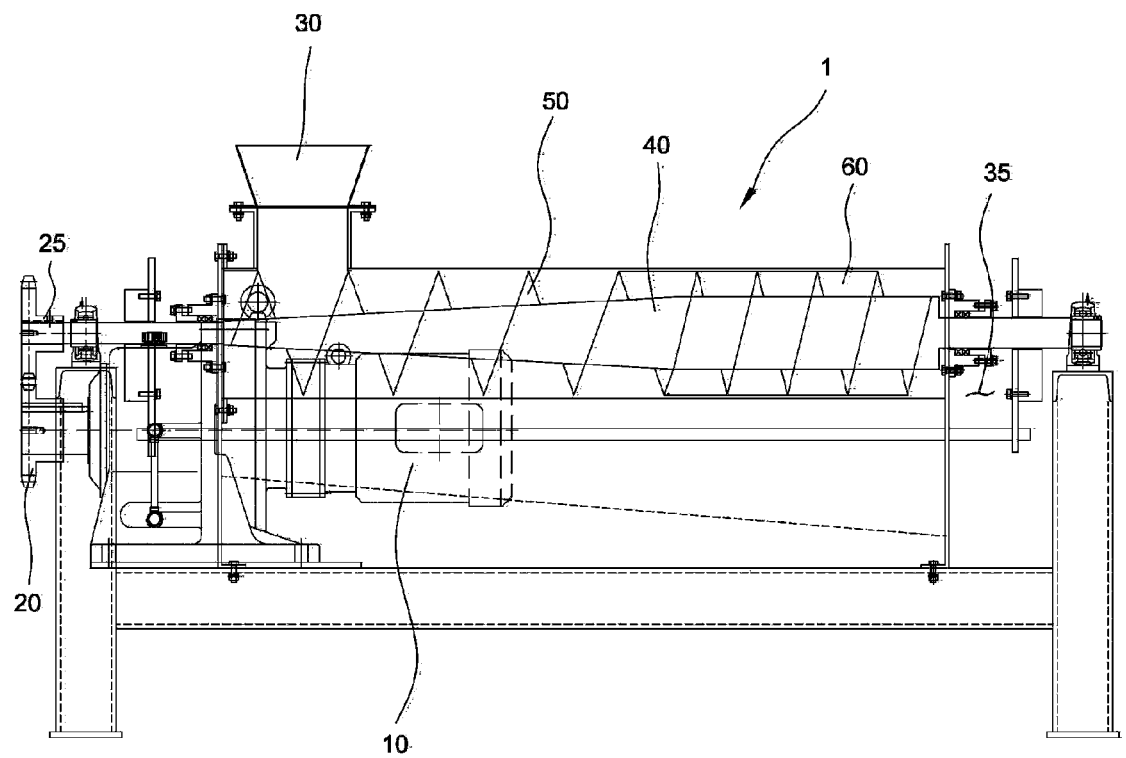
FIG. 1 is a front view illustrating a screw press dehydrator according to the present invention.

Hereinafter, the present invention will be described in detail with reference to the annexed drawings such that those having ordinary skill in the art can easily implement the present invention. Like reference numerals refer to like elements throughout the disclosure.

FIG. 1 is a front view illustrating a screw press dehydrator according to the present invention.

As shown in FIG. 1, the screw press dehydrator 1 according to the present invention has a configuration in which a large gear 20 is connected to a driving shaft of a driving motor 10 providing power and a central shaft 40 is connected to a small gear 25 connected to the large gear 20 via a chain (not shown) so that the central shaft 40 is rotated upon rotation of the driving motor 10.

The screw press dehydrator 1 is provided in an upper part thereof with a sludge inlet 30 having a hopper shape through which sludge is fed, and a screw 50 for transporting the sludge from the sludge inlet 30 to the sludge outlet 35. The screw 50 is helically formed on the outer circumference of the central shaft 40 and functions to transport the sludge from the sludge inlet 30 to the sludge outlet 35 and remove water from sludge by application of rotation and cutting forces to the sludge.

In addition, a plurality of cutting panels 60 are formed in a row in a direction of the central shaft 40 between the screws 50 and a cutting blade 61 is bent at an acute angle or an obtuse angle on an end of each of the cutting panels 60 and is fixedly or removably mounted thereon.

When the screw 50 is rotated by the rotation of the central shaft 40, the cutting panel 60 provided with the cutting blade 61 further applies cutting force in a vertical direction to the sludge transported by the screw 50, thereby destroying cell membranes of microbes constituting the sludge.

That is, the sludge is compressed by the rotation force of the screw 50 and cutting force is applied to the sludge by the cutting panel 60, thereby providing more effective dehydration of the sludge.

The sludge is produced by organic substances in which microorganisms such as raw sludge, domestic sewage or livestock wastes are precipitated.

Water is naturally discharged down from the sludge fed through the sludge inlet 30 while the sludge is compressed and transported by the rotation force of the screw 50 and sludge which is sufficiently dehydrated by the cutting force generated by the screw 50 and the cutting panel 60 is discharged in the form of a cake from the sludge outlet 35.

The water contained in the sludge is removed when the sludge is compressed and transported by the rotation of the screw 50. Accordingly, a weight of the sludge in the form of the cake discharged from the sludge outlet 35 is greatly decreased.

Figure 2:
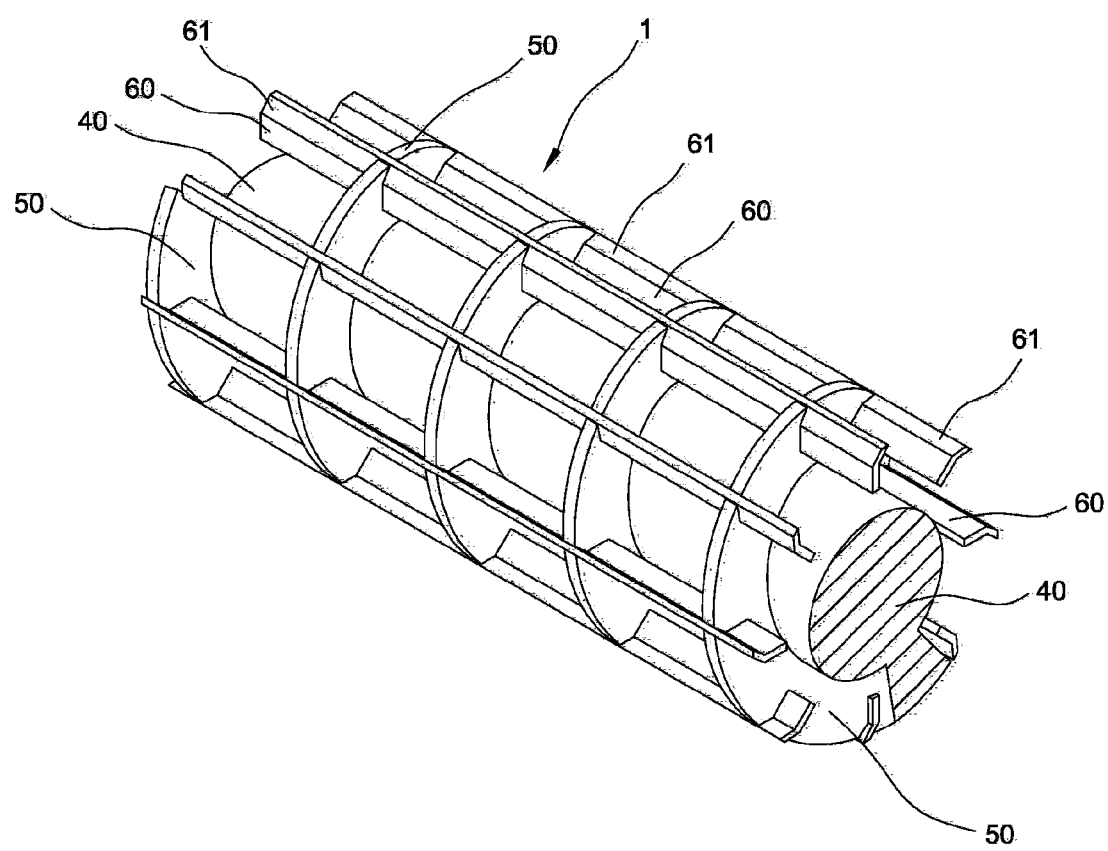
FIG. 2 is an exploded perspective view illustrating a screw press dehydrator provided with a cutting blade and a plurality of cutting panels disposed in parallel with a central shaft according to the present invention.
Figures 3A, 3B:
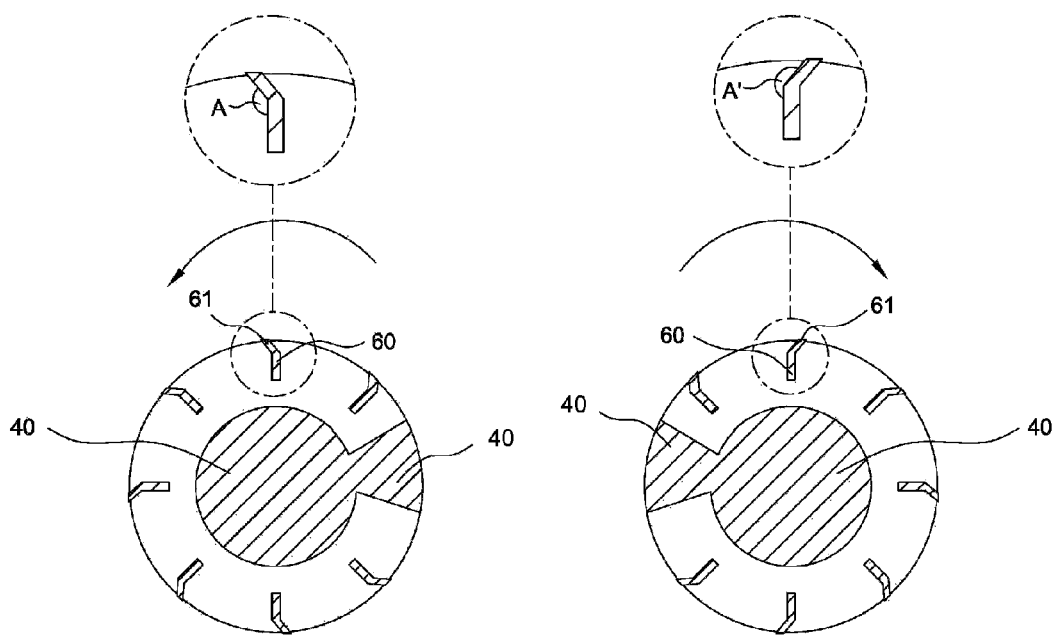
FIG. 3A is a cross-sectional view illustrating a gap formed between the central shaft and the cutting panel according to the present invention.
FIG. 3B is a cross-sectional view illustrating a gap formed between the central shaft and the cutting panel according to the present invention.

FIG. 2 is an exploded perspective view illustrating a screw press dehydrator provided with cutting blades and a plurality of cutting panels disposed in parallel with the central shaft and FIGS. 3A and 3B are cross-sectional views illustrating a gap formed between the central shaft and the cutting panel according to the present invention.

As shown in FIGS. 2, 3A, and 3B, the cutting panels 60 are fixedly mounted on the screw 50 such that the cutting panels 60 are spaced from the central shaft in parallel with the central shaft. The cutting panels 60 are fixed to the outside of the screw 50 helically adhered to the central shaft 40 and thus the cutting panels 60 do not contact the central shaft 40, thus causing formation of a predetermined gap between the central shaft 40 and the cutting panel 60.

The sludge is dehydrated through the gap when the sludge is smoothly compressed and transported by rotation of the screw 50.

A plurality of holes may be formed in the cutting panels 60 applying cutting force to the sludge in a direction vertical to the transport direction of the screw. By forming the plurality of holes, the cutting force can be further directly applied to the sludge and dehydration can be further facilitated due to easy discharge of water.

The cutting blade 61 bent at an acute angle or an obtuse angle is formed on an end of the cutting panel 60. The cutting blade 61 has an angle A or A' of 40 to 140° in a horizontal direction on the end of the cutting panel 60 and the cutting blade 61 is fixedly or removably mounted on the cutting panel 60. The cutting blade 61 may be mounted over the entire dehydration region of the screw 50 or a certain region where dehydration is concentrated, to facilitate dehydration effects.

The cutting blade 61 is attached to the cutting panel 60 and increases cutting force in a vertical direction to sludge, which is transported forward upon rotation of the screw 50, and removes sludge solids filling holes or gaps of a porous drum or multi-disc disposed in the outside of the dehydrator and thereby prevents the holes or gaps from clogging.

A rotation angle of the cutting blade 61, based on the cutting panel 60, is changed according to a direction in which the central shaft 40 is rotated or an angle at which the cutting blade 61 is formed.

This will be described with reference to FIGS. 3A and 3B. In a case in which the cutting blade 61 is bent left as shown in FIG. 3A, a rotation angle A of the cutting blade 61 applied to the sludge when the central shaft 40 rotates in a right direction is within 95 to 140° when an end of the cutting panel 60 is horizontal. The cutting blade 61 formed at an acute angle or an obtuse angle applies cutting force to the sludge by scrubbing or scraping the sludge attached to the porous drum, thereby efficiently removing the sludge solids and the like present on the porous drum or multi-disc.

Figure 4:
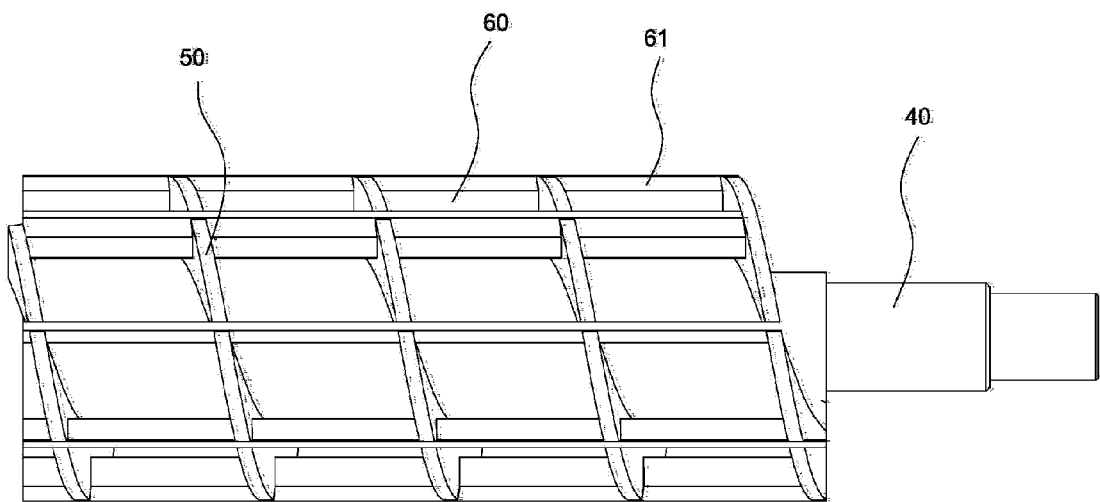
FIG. 4 is a side view illustrating a screw press provided with a screw and a cutting blade according to the present invention.
Figure 5:
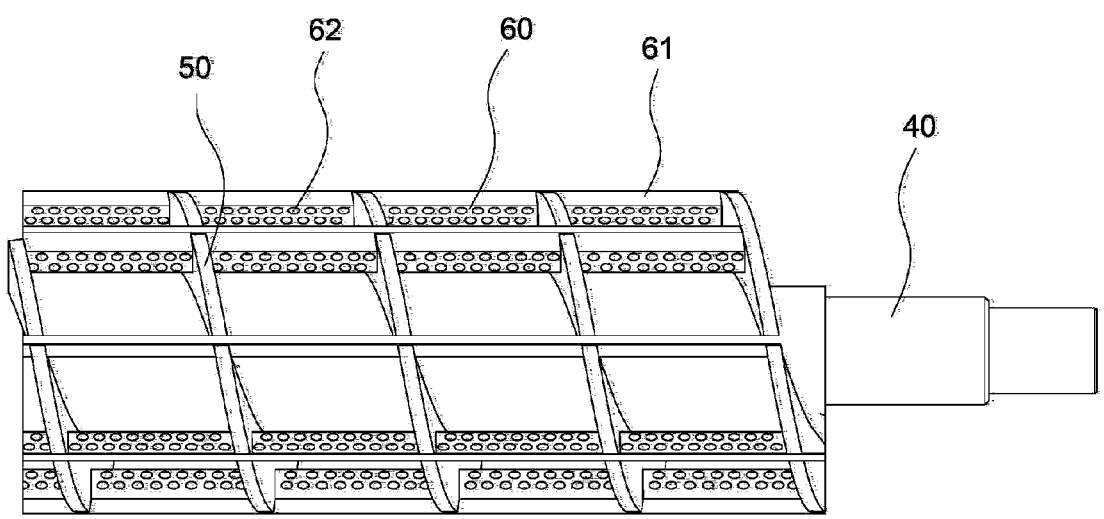
FIG. 5 is a side view illustrating a cutting panel provided with a plurality of holes according to another embodiment of the present invention.

FIG. 4 is a side view illustrating a screw press provided with a screw and a cutting blade according to the present invention and FIG. 5 is a side view illustrating a cutting panel provided with a plurality of holes according to another embodiment of the present invention.

As shown in FIG. 5, the cutting panel 60 is provided with a plurality of holes 62, thereby efficiently destroying cell membranes and the like of the sludge microorganisms and facilitating dehydration of the sludge.

The number of the holes 62 formed in the cutting panel 60 may be suitably controlled according to the demand of the user, and the size of holes is also controlled according to work environments, water content of sludge and the like. The holes 62 are sporadically formed so that intensive dehydration at a predetermined position is possible.

Figure 6A:
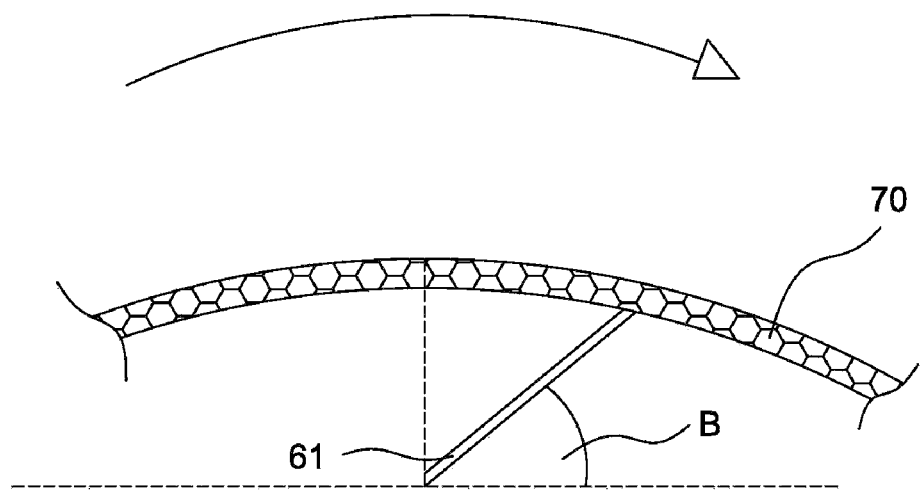
FIG. 6A shows an angle of the cutting blade adhered to the cutting panel according to the present invention.
Figure 6B:
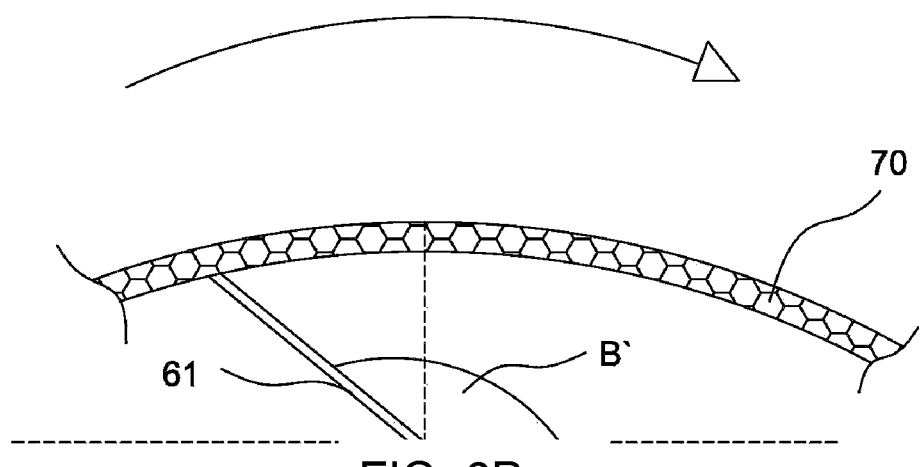
FIG. 6B shows an angle of the cutting blade adhered to the cutting panel according to the present invention.

FIGS. 6A and 6B show an angle of the cutting blade adhered to the cutting panel of the present invention.

As shown in FIGS. 6A and 6B, the cutting blade 61 may be formed at an angle of 40° to 140° and an angle B at which the cutting blade 61 of FIG. 6A is formed is 40° and an angle B' at which the cutting blade 61 of FIG. 6B is formed is 140°.

When the cutting blade 61 is formed at the angle B of 40°, as shown in FIG. 6A, sludge attached to the drum mesh 70 is pushed inside the cutting panel 60 upon clockwise rotation of the central shaft 40. When the cutting blade 61 is formed at the angle A' of 140°, as shown in FIG. 6B, the sludge is pushed outside the drum mesh 70 and is then removed. The sludge can be more efficiently removed by controlling the angle of the cutting blade 61 formed in the cutting panel 60.

In accordance with the screw press dehydrator according to the present invention, the cutting panel 60 is formed on the screw 50 such that it is spaced from the central shaft and destroys cell membranes of cells constituting the sludge by applying strong cutting force to the sludge, discharges water present in the cells, and facilitates sludge dehydration, unlike the related art. The cutting panel 60 is further provided at an end thereof with the cutting blade 61 so that solids that may clog the mesh or porous net in the dehydrator can be effectively removed upon rotation of the screw 50.

In addition, when the sludge is dehydrated with the screw press dehydrator using the cutting blade according to the present invention, water content is reduced to 62 to 75%, volume and weight of the sludge are decreased and sludge treatment costs are greatly reduced.

In addition, costs required for drying the dehydrated sludge are reduced, environmental pollution is prevented by reduction of waste generation and sludge is recycled for a variety of applications such as construction materials.

As apparent from the above description, the present invention provides a screw press dehydrator which is provided with the cutting blade and has a gap between the central shaft and the cutting panel, thereby easily destroying cell membranes of sludge by compression and easily dehydrating the sludge filling holes of the mesh by scraping the sludge.

In addition, sludge having a high water content can be easily dehydrated using the cutting panel having the gap between the central shaft and the cutting panel and being provided on an end thereof with the cutting blade.

In general, the sludge produced in the process of disposing sewage or livestock excretions, which is derived from microorganism cells under aerobic or anaerobic conditions, is not readily dehydrated, because water present in cells is not easily dehydrated. On the other hand, microorganism cell membranes constituting most of the sludge are destroyed by compression and water is thus easily removed from the sludge using a screw press dehydrator including a cutting panel having a cutting blade adhered thereto according to the present invention.

In accordance with the cutting panel including the cutting blade bent at a predetermined angle, the end of the cutting blade removes solids present in the porous mesh or gaps in the dehydrator by scraping and the water content of sludge cakes can be reduced to 55 to 75% which is a level that cannot be obtained by a conventional sludge dehydration method.

Although the screw press dehydrator provided with cutting panels spaced from one another has been disclosed for illustrative purposes, those skilled in the art will appreciate that various modifications, additions and substitutions are possible, without departing from the scope and spirit of the invention as disclosed in the accompanying claims.

What is claimed is:

1. A screw press dehydrator for dehydrating sludge including spaced cutting panels, the screw press dehydrator comprising:
   a central shaft rotatably connected to a driving motor;
   a plurality of screws helically formed on the outer circumference of the central shaft, the screws transporting sludge and generating compression force upon rotation of the central shaft to dehydrate the sludge;
   a plurality of cutting panels fixed to the screw, the cutting panels being spaced from the central shaft in parallel with the shaft at the outside of the screw; and
   a cutting blade bent at an acute angle or an obtuse angle on an end of each of the cutting panels,
   wherein the cutting blade removes sludge solids clogging a drum mesh or a plurality holes upon rotation of the central shaft having the screw attached thereto.

2. The screw press dehydrator according to claim 1, wherein the cutting panel applies a cutting force in a vertical direction to the sludge transported forward upon rotation of the screw to destroy cell membranes of microorganisms constituting the sludge and facilitate dehydration of the sludge.

3. The screw press dehydrator according to claim 1, wherein the cutting blade is formed at an acute or obtuse angle of 40 to 140° when the end of the cutting panel is horizontal.

4. The screw press dehydrator according to claim 1, wherein the cutting blade is fixedly or removably mounted on the cutting panel.

* * * * *